United States Patent
Yoon et al.

(10) Patent No.: US 12,215,853 B2
(45) Date of Patent: Feb. 4, 2025

(54) OPTICAL SYSTEM INCLUDING DOME LIGHT AND COAXIAL LIGHT AND METHOD FOR DESIGNING OPTICAL SYSTEM

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Yeoreum Yoon, Suwon-si (KR); Byoungho Lee, Seoul (KR); Hanjin Cho, Seoul (KR); Yongsung Kim, Suwon-si (KR); Taeeun Kim, Suwon-si (KR); Siwoo Lee, Seoul (KR); Jiyong Jang, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 18/597,336

(22) Filed: Mar. 6, 2024

(65) Prior Publication Data
US 2024/0210008 A1 Jun. 27, 2024

Related U.S. Application Data

(63) Continuation of application No. PCT/KR2022/013347, filed on Sep. 6, 2022.

(30) Foreign Application Priority Data

Sep. 6, 2021 (KR) .......................... 10-2021-0118322
Oct. 21, 2021 (KR) .......................... 10-2021-0140939

(51) Int. Cl.
*F21V 5/00* (2018.01)
*F21V 19/00* (2006.01)
(Continued)

(52) U.S. Cl.
CPC .............. *F21V 5/00* (2013.01); *F21V 19/003* (2013.01); *G01B 11/24* (2013.01); *F21Y 2115/10* (2016.08)

(58) Field of Classification Search
CPC ............................ G01B 11/24; G01N 21/8806
See application file for complete search history.

(56) References Cited

U.S. PATENT DOCUMENTS

| 7,041,997 B2 | 5/2006 | Paradis |
| 9,467,609 B2 * | 10/2016 | White ................... H04N 23/56 |
| 9,485,394 B1 | 11/2016 | White |

(Continued)

FOREIGN PATENT DOCUMENTS

| JP | 2007-10640 A | 1/2007 |
| JP | 2014-134525 A | 7/2014 |

(Continued)

OTHER PUBLICATIONS

International Search Report (PCT/ISA/210) issued Dec. 14, 2022 by the International Searching Authority in International Patent Application No. PCT/KR2022/013347.

(Continued)

*Primary Examiner* — Karabi Guharay
(74) *Attorney, Agent, or Firm* — Sughrue Mion, PLLC

(57) ABSTRACT

A method of designing an optical system including a dome light and coaxial light, includes: determining a distance between the dome light and the coaxial light based on a radius reduction according to a hole of the dome light; determining a size of the coaxial light based on an optical path of a light ray emitted from the coaxial light; and determining a structure of a printed circuit board (PCB) in the dome light based on an optical path through which the light ray emitted from the coaxial light is reflected by an object.

15 Claims, 13 Drawing Sheets

(51) Int. Cl.
F21Y 115/10 (2016.01)
G01B 11/24 (2006.01)

(56) References Cited

U.S. PATENT DOCUMENTS

| | | | |
|---|---|---|---|
| 10,451,547 B2 | 10/2019 | Ser | |
| 2014/0168382 A1 | 6/2014 | Jang | |
| 2015/0253129 A1 | 9/2015 | Ohnishi | |
| 2018/0087894 A1 | 3/2018 | Kim et al. | |
| 2020/0072758 A1 | 3/2020 | Skopinski | |
| 2020/0182801 A1 | 6/2020 | Fang | |
| 2021/0182519 A1 | 6/2021 | Trebing et al. | |
| 2022/0228721 A1 | 7/2022 | Lee | |

FOREIGN PATENT DOCUMENTS

| | | |
|---|---|---|
| JP | 2015-169510 A | 9/2015 |
| JP | 2017-146302 A | 8/2017 |
| KR | 10-1087180 B1 | 11/2011 |
| KR | 10-2012-0134806 A | 12/2012 |
| KR | 10-1495299 B1 | 2/2015 |
| KR | 10-2016-0024215 A | 3/2016 |
| KR | 10-1737954 B1 | 5/2017 |
| KR | 10-1867351 B1 | 6/2018 |
| KR | 10-1873648 B1 | 7/2018 |
| KR | 10-2179236 B1 | 11/2020 |
| KR | 10-2224699 B1 | 3/2021 |
| KR | 10-2021-0100009 A | 8/2021 |

OTHER PUBLICATIONS

Written Opinion (PCT/ISA/237) issued Dec. 14, 2022 by the International Searching Authority in International Patent Application No. PCT/KR2022/013347.

* cited by examiner

OPTICAL SYSTEM INCLUDING DOME LIGHT AND COAXIAL LIGHT AND METHOD FOR DESIGNING OPTICAL SYSTEM

CROSS-REFERENCE TO RELATED APPLICATIONS

This application is a continuation of International Application No. PCT/KR2022/013347, filed on Sep. 6, 2022 in the Korean Intellectual Property Receiving Office, which is based on and claims priority to Korean Patent Application No. 10-2021-0118322, filed on Sep. 6, 2021, and Korean Patent Application No. 10-2021-0140939, filed on Oct. 21, 2021, in the Korean Intellectual Property Office, the disclosures of which are incorporated by reference herein in their entireties.

BACKGROUND

1. Field

This disclosure relates to an optical system including a dome light and a coaxial light, and a method for designing the optical system. Additionally, this disclosure relates to a method and apparatus for designing a uniform optical system including a dome light and a coaxial light for high-gloss surface analysis.

2. Description of Related Art

In many industrial fields, there is a demand for technology development for a system that can reliably extract three dimensional shape information of moving metal objects or object surfaces in real time. A lot of effort is being made to improve the quality of final products by identifying and excluding various surface defects, and the development of related technologies is continuously required.

An optical system for analyzing information on the surface of an object is designed to analyze the surface of the object by emitting light to the object and analyzing images taken of the light reflected from the object.

If the environment for obtaining images of high-gloss objects made of specular reflective material, such as mirrors, is uneven, environmental factors are included directly in the analysis images. Hence, a high level of uniformity is required in the image capturing environment.

Therefore, in the case of a high-gloss object, an optical design optimized for the shape and material of the object is required. However, when designing lighting according to the object's application field, analysis of high-gloss objects with complex shapes may be difficult for existing optical systems.

Accordingly, there is a need for a technique and system that can overcome these problems and reliably extract a three-dimensional shape of the surface of a metal object.

If the optical system is not precisely designed, non-uniformity may occur due to environmental factors, such as non-uniformity due to a camera hole or non-uniformity due to lighting, when obtaining an image of a high-gloss object.

SUMMARY

Provided are a method and apparatus for designing an optical system that can analyze the surface of an object made of high-gloss material while eliminating non-uniformity due to the imaging environment.

Additional aspects will be set forth in part in the description which follows and, in part, will be apparent from the description, or may be learned by practice of the presented embodiments.

According to an aspect of the disclosure, a method of designing an optical system including a dome light and a coaxial light, includes: determining a distance between the dome light and the coaxial light based on a radius reduction according to a hole of the dome light; determining a size of the coaxial light based on an optical path of a light ray emitted from the coaxial light; and determining a structure of a printed circuit board (PCB) in the dome light based on an optical path through which the light ray emitted from the coaxial light is reflected by an object.

The determining the distance between the dome light and the coaxial light may include determining the radius reduction according to the hole of the dome light based on a radius of the dome light and a size of the hole of the dome light.

The determining the distance between the dome light and the coaxial light may include determining the radius reduction according to the hole of the dome light by using a spatial relationship of a triangle having a hypotenuse corresponding to the radius of the dome light, a base corresponding to one half of the size of the hole of the dome light, and a height corresponding to a difference between the radius reduction according to the hole of the dome light and the radius of the dome light.

The determining the size of the coaxial light may include determining the size of the coaxial light based on a difference between the radius reduction according to the hole of the dome light and a radius of the dome light, the size of the hole of the dome light, and the distance between the dome light and the coaxial light.

The determining the size of the coaxial light further may include determining the size of the coaxial light by using a spatial relationship of an isosceles triangle with a base corresponding to the size of the coaxial light and with a height corresponding to the size of the coaxial light, the distance between the dome light and the coaxial light, and the difference between the radius reduction according to the hole of the dome light and the radius of the dome light.

The dome light may include the PCB, a plurality of light emitting diodes (LEDs) mounted on the PCB, and a diffuser; and the determining the structure of the PCB in the dome light may include determining the structure of the PCB based on a size difference between the PCB and the diffuser.

The determining the structure of the PCB in the dome light may include determining the size difference between the PCB and the diffuser based on a difference between the radius reduction according to the hole of the dome light and a radius of the dome light, the size of the coaxial light, and a thickness of the dome light.

The determining the structure of the PCB in the dome light may include determining the size difference between the PCB and the diffuser by using a spatial relationship of a first triangle having a base corresponding to the size difference between the PCB and the diffuser and a height corresponding to the thickness of the dome light, and a spatial relationship of a second triangle having a base corresponding to ¼ of the size of the coaxial light and a height corresponding to a the difference between the radius reduction according to the hole of the dome light and the radius of the dome light, and the size of the coaxial light.

According to an aspect of the disclosure, an optical system includes: a dome light including a printed circuit board (PCB); and a coaxial light, wherein the dome light and the coaxial light are arranged in correspondence to a distance between the dome light and the coaxial light, based on a radius reduction according to a hole of the dome light, a size of the coaxial light is based on an optical path of a light ray emitted from the coaxial light, and a structure of the PCB of the dome light is based on an optical path through which the light ray emitted from the coaxial light is reflected by an object.

The radius reduction according to the hole of the dome light may be based on a radius of the dome light and a size of the hole of the dome light.

The radius reduction according to the hole of the dome light may be determined by using a spatial relationship of a triangle having a hypotenuse corresponding to the radius of the dome light, a base corresponding to one half of the size of the hole of the dome light, and a height corresponding to a difference between the radius reduction according to the hole of the dome light and the radius of the dome light.

The size of the coaxial light may be based on a difference between the radius reduction according to the hole of the dome light a radius of the dome light, a size of the hole of the dome light, and the distance between the dome light and the coaxial light.

The size of the coaxial light may be determined by using a spatial relationship of an isosceles triangle having a base corresponding to the size of the coaxial light and a height corresponding to a the size of the coaxial light, the distance between the dome light and the coaxial light, and the difference between the radius reduction according to the hole of the dome light and the radius of the dome light.

The dome light may further include a plurality of LEDs mounted on the PCB and a diffuser; and the structure of the PCB may be based on a size difference between the PCB and the diffuser.

The size difference between the PCB and the diffuser may be based on a difference between the radius reduction according to the hole of the dome light and a radius of the dome light, the size of the coaxial light, and a thickness of the dome light.

DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
FIG. 1 is a diagram illustrating an optical system including a dome light and a coaxial light according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a diagram illustrating a design apparatus 100 for an optical system (e.g., optical system 200 in FIG. 2) including a dome light and a coaxial light according to one or more embodiments.

The design apparatus 100 according to one or more embodiments may design the optical system 200 by determining the distance between the dome light (e.g., dome light 240 in FIG. 2) and the coaxial light (e.g., coaxial light 230 in FIG. 2), the size of the coaxial light 230, and/or the PCB structure within the dome light 240.

According to an embodiment, the design apparatus 100 may determine the distance between the dome light 240 and the coaxial light 230 based on the radius reduction according to the hole of the dome light 240. The design apparatus 100 may determine the radius reduction according to the hole of the dome light 240.

The hole of the dome light 240 may be a constituent necessary for the camera 210 to photograph the object 1000. When the design apparatus 100 fabricates a hole in the dome light 240, the radius of the dome light 240 may be reduced in correspondence to the size of the hole.

The design apparatus 100 may determine the radius reduction according to the hole of the dome light 240 based on the radius of the dome light 240 and the hole size of the dome light 240.

The design apparatus 100 can design the optical system 200 in detail by considering the radius reduction according to the hole of the dome light 240 when determining the distance between the dome light 240 and the coaxial light 230.

According to an embodiment, the design apparatus 100 may determine the size of the coaxial light 230.

Figure 2:
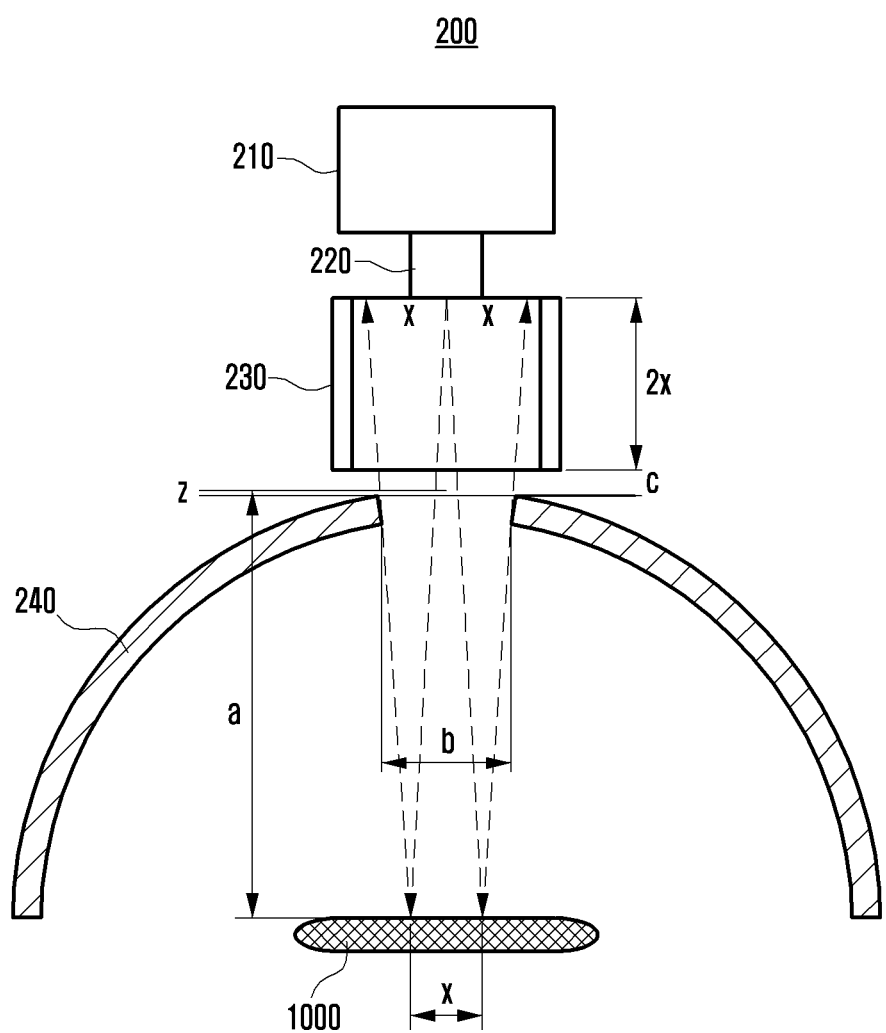
FIG. 2 is a diagram illustrating an optical system according to an embodiment.

The size of the coaxial light 230 may be designed such that light rays emanating from the coaxial light 230 are reflected on the object (e.g., object 1000 in FIG. 2) but do not cause non-uniformity to the optical path of the light ray captured by the camera (e.g., camera 210 in FIG. 2).

The design apparatus 100 according to an embodiment may determine the size of the coaxial light 230 on the basis of the value obtained by subtracting the radius reduction according to the hole of the dome light 240 from the radius of the dome light 240, the size of the hole of the dome light 240, and the distance between the dome light 240 and the coaxial light 230.

According to an embodiment, the design apparatus 100 may determine the PCB structure inside the dome light 240.

A PCB (e.g., PCB 241 in FIG. 6) and/or a diffuser (e.g., diffuser 242 in FIG. 6) may be included inside the dome light 240, and the design apparatus 100 can design the PCB 241 on which LEDs are mounted and the diffuser 242 so that non-uniform points do not occur inside the dome light 240.

The design apparatus 100 according to an embodiment may determine the size difference between the PCB 241 and the diffuser 242 in the dome light 240 on the basis of the value obtained by subtracting the radius reduction according to the hole of the dome light 240 from the radius of the dome light 240, the size of the coaxial light 230, and the thickness of the dome light 240.

FIG. 2 is a diagram illustrating an optical system 200 according to one or more embodiments.

The optical system 200 according to one or more embodiments may be a system designed to analyze the surface of a high-gloss object 1000.

According to one or more embodiments, the optical system 200 may include a camera 210, a lens 220, a coaxial light 230, and/or a dome light 240. The optical system 200 may include a combination of a dome light 240 and a coaxial light 230 to create uniform lighting conditions.

The coaxial light 230 according to one or more embodiments may emit light rays to the object 1000. The coaxial light 230 may be designed to have a size of 2× in width and 2× in length, and to be separated by c from the dome light 240.

The dome light 240 according to one or more embodiments may emit light rays to the object 1000. The dome light 240 may have a radius of a, and a hole of size b may be fabricated in the dome light 240 to photograph the rays emitted from the dome light 240 and the coaxial light 230 by using the camera 210. Additionally, the radius of the dome light 240 may be reduced by z during hole fabrication.

According to one or more embodiments, the design apparatus 100 may design the optical system 200 on the basis of the radius of the dome light 240 ($a$), the size of the hole of the dome light 240 ($b$), the distance between the dome light 240 and the coaxial light 230 ($c$), the radius reduction according to the hole of the dome light 240 ($z$), and the size of the coaxial light 230 ($2x$).

Figure 3:
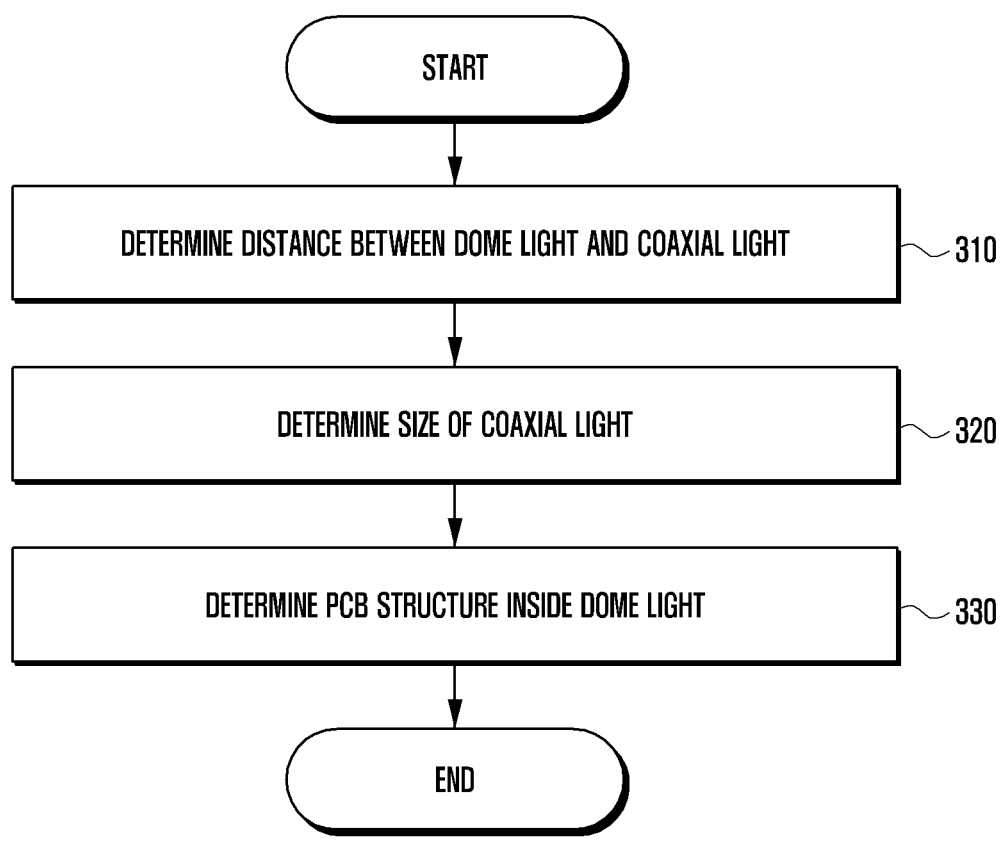
FIG. 3 is a flowchart showing a method of designing an optical system including a dome light and a coaxial light according to one or more embodiments.

FIG. 3 is a flowchart showing a method for designing an optical system including a dome light (e.g., dome light 240 in FIG. 2) and a coaxial light (e.g., coaxial light 230 in FIG. 2) according to one or more embodiments.

According to one or more embodiments, at operation 310, the design apparatus (e.g., design apparatus 100 in FIG. 1) may determine the distance (c) between the dome light 240 and the coaxial light 230.

The design apparatus 100 according to an embodiment may determine the radius reduction (z) according to the hole of the dome light 240.

The hole of the dome light 240 may be a constituent necessary for the camera 210 to photograph the object 1000. When the design apparatus 100 fabricates a hole in the dome light 240, the radius of the dome light 240 may be reduced by z corresponding to the size of the hole.

The design apparatus 100 may determine the radius reduction (z) according to the hole of the dome light 240 based on the radius (a) of the dome light 240 and the hole size (b) of the dome light 240.

The design apparatus 100 according to an embodiment may determine the distance (c) between the dome light 240 and the coaxial light 230 based on the radius reduction (z) according to the hole of the dome light 240. The design apparatus 100 can design the optical system 200 in detail by considering the radius reduction (z) according to the hole of the dome light 240 when determining the distance (c) between the dome light 240 and the coaxial light 230.

According to one or more embodiments, at operation 320, the design apparatus 100 may determine the size (2×) of the coaxial light 230.

The size of the coaxial light 230 may be designed so that light rays emanating from the coaxial light 230 are reflected on the object 1000 but do not cause non-uniformity to the optical path of the light ray captured by the camera 210.

The design apparatus 100 according to an embodiment may determine the size (2×) of the coaxial light 230 on the basis of the radius (a) of the dome light 240, the value (a') obtained by subtracting the radius reduction (z) according to the hole of the dome light 240 from the radius (a) of the dome light 240, the hole size (b) of the dome light 240, and the distance (c) between the dome light 240 and the coaxial light 230.

According to one or more embodiments, at operation 330, the design apparatus 100 may determine the PCB structure inside the dome light 240.

A PCB 241 on which LEDs are mounted and/or a diffuser 242 may be included inside the dome light 240, and the design apparatus 100 can design the PCB 241 and the diffuser 242 so that non-uniform points do not occur inside the dome light 240.

The design apparatus 100 according to an embodiment may determine the size difference (y) between the PCB 241 and the diffuser 242 in the dome light 240 on the basis of the value (a') obtained by subtracting the radius reduction (z) according to the hole of the dome light 240 from the radius (a) of the dome light 240, the size (2×) of the coaxial light 230, and the thickness (d) of the dome light 240.

Figure 4A:
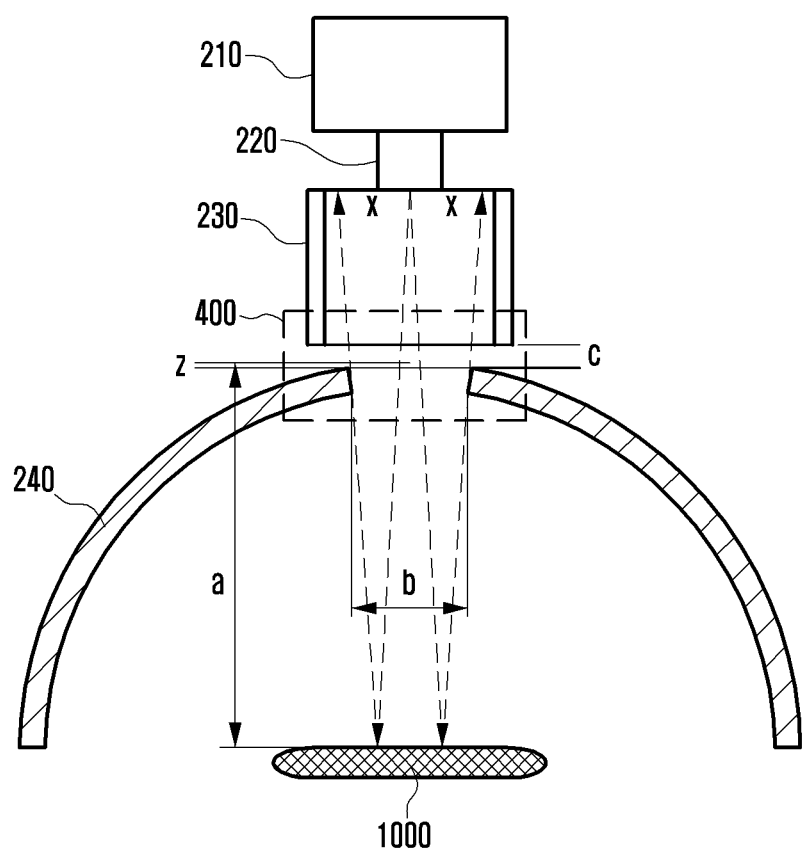
FIGS. 4A, 4B, and 4C are diagrams of an optical system used to describe a scheme for determining the distance between the dome light and the coaxial light in an optical system design method employed by a design apparatus according to one or more embodiments.
Figure 4B:
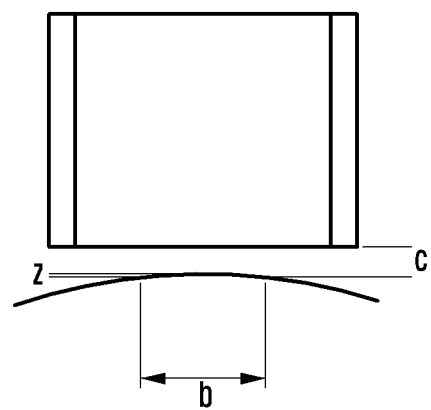
Figure 4C:
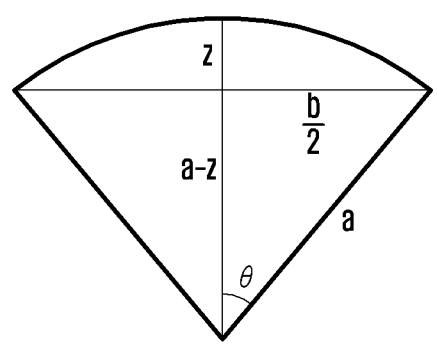

FIGS. 4A, 4B, and 4C are diagrams of an optical system 200 used to describe a scheme for determining the distance (c) between the dome light 240 and the coaxial light 230 in an optical system design method employed by the design apparatus 200 according to one or more embodiments.

FIGS. 4A, 4B, and 4C may be diagrams shown to describe operation 310 in FIG. 3.

In FIGS. 4A, 4B, 4C, 'a' may be the radius of the dome light 240, 'b' may be the size of the hole of the dome light 240, 'c' may be the distance between the dome light 240 and the coaxial light 230, and 'z' may be the radius reduction according to the hole of the dome light 240.

FIG. 4A illustrates the overall structure of the optical system 200 to be designed according to one or more embodiments.

FIG. 4B is an enlarged illustration of a region 400 of FIG. 4A including the distance (c) between the dome light 240 and the coaxial light 230.

FIG. 4C is an enlarged illustration of the arc region of FIG. 4B. With reference to FIG. 4C, the design apparatus 100 may determine the radius reduction (z) according to the hole of the dome light 240 by using a triangle having the radius (a) of the dome light 240 as hypotenuse, a half (b/2) of the hole size of the dome light 240 as base, and the value (a-z) obtained by subtracting the radius reduction according to the hole from the radius of the dome light 240 as height.

The hole of the dome light 240 may be a constituent necessary for the camera 210 to photograph the object 1000. When the design apparatus 100 fabricates a hole in the dome light 240, the radius of the dome light 240 may be reduced by z in correspondence to the size of the hole.

The design apparatus 100 may determine the radius reduction (z) according to the hole of the dome light 240 based on the radius (a) of the dome light 240 and the hole size (b) of the dome light 240.

With reference to FIG. 4C, θ may be defined as Equation 1 below based on the hole size (b) of the dome light 240 and the radius (a) of the dome light 240.

$$\theta = \sin^{-1}\frac{\frac{b}{2}}{a} \qquad \text{[Equation 1]}$$

The radius reduction (z) according to the hole of the dome light 240 can be defined as Equation 2 based on trigonometric identities and Equation 1.

$$a*\cos\theta = a - z \qquad \text{[Equation 2]}$$
$$z = a - a*\cos\theta$$
$$= a - a*\cos\left(\sin^{-1}\frac{\frac{b}{2}}{a}\right)$$

The design apparatus 100 according to an embodiment may determine the distance (c) between the dome light 240 and the coaxial light 230 based on the radius reduction (z) according to the hole of the dome light 240.

Figure 5A:
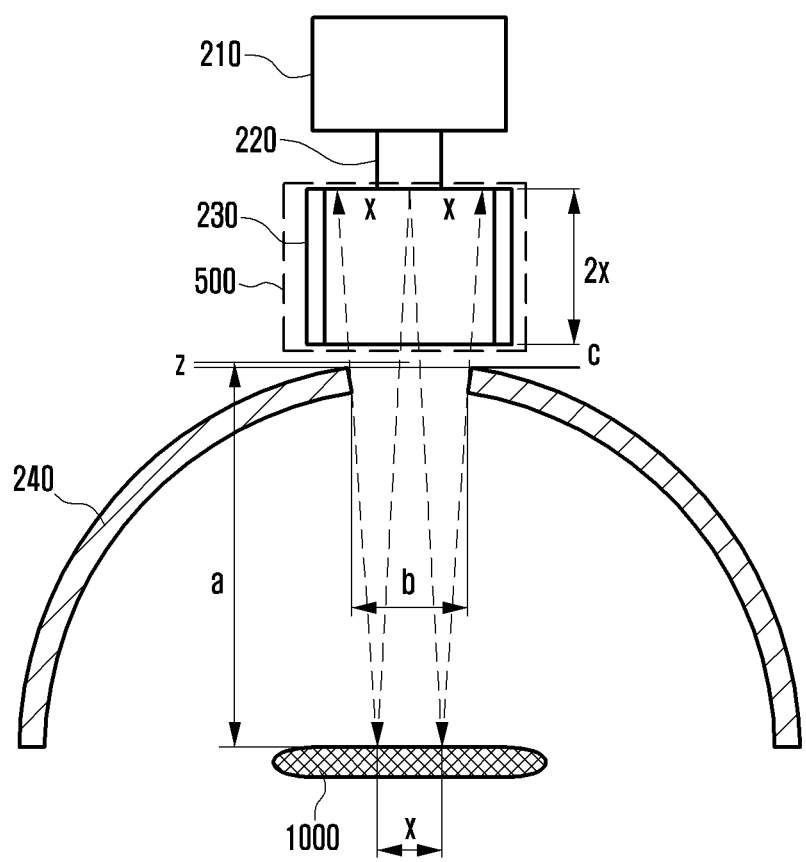
FIGS. 5A and 5B are diagrams of an optical system used to describe a scheme for determining the size of the coaxial light in the optical system design method employed by the design apparatus according to one or more embodiments.
Figure 5B:
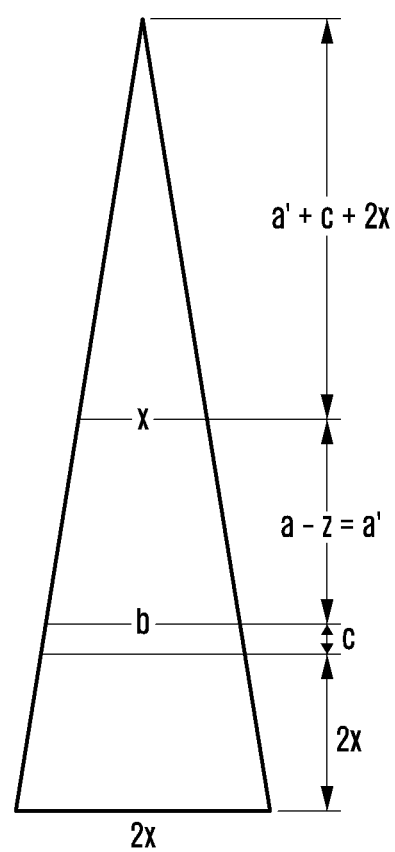

FIGS. 5A and 5B are diagrams of an optical system 200 used to describe a scheme for determining the size (2×) of the coaxial light 230 in the optical system design method employed by the design apparatus 100 according to one or more embodiments.

FIGS. 5A and 5B may be diagrams shown to describe operation 320 in FIG. 3.

In FIGS. 5A and 5B, 'a' may be the radius of the dome light 240, 'b' may be the size of the hole of the dome light 240, 'c' may be the distance between the dome light 240 and the coaxial light 230, and 'x' may be the size of the coaxial light 230.

FIG. 5A is the overall structure of the optical system 200 to be designed according to one or more embodiments.

FIG. 5B illustrates the optical path of light rays of the coaxial light 230 including a region 500 of FIG. 5A.

The size of the coaxial light 230 may be designed so that light rays emanating from the coaxial light 230 are reflected on the object 1000 but do not cause non-uniformity to the optical path of the light ray captured by the camera 210.

The design apparatus 100 according to an embodiment may determine the size (2×) of the coaxial light 230 on the basis of the radius (a) of the dome light 240, the value (a') obtained by subtracting the radius reduction (z) according to the hole of the dome light 240 from the radius (a) of the dome light 240, the hole size (b) of the dome light 240, and the distance (c) between the dome light 240 and the coaxial light 230.

FIG. 5B illustrates the path of the light ray emanating from the center of the coaxial light 230 in the form of an isosceles triangle. With reference to FIG. 5B, the design apparatus 100 may determine the size of the coaxial light 230 by using an isosceles triangle that has the size (2×) of the coaxial light 230 as base, and the value obtained by summing together the size (2×) of the coaxial light 230, the distance (c) between the dome light 240 and the coaxial light 230, the value (a') obtained by subtracting the radius reduction (z) according to the hole of the dome light 240 from the radius (a) of the dome light 240, and the value obtained by adding a', c, and 2× as height.

According to Equation 3 below, the value obtained by subtracting the radius reduction (z) according to the hole of the dome light 240 from the radius (a) of the dome light 240 may be defined as a'.

$$a' = a - z = a*\cos\left(\sin^{-1}\frac{\frac{b}{2}}{a}\right) \qquad \text{[Equation 3]}$$

The size (2×) of the coaxial light 230 can be defined as Equation 4 based on isosceles triangle properties and Equation 3.

$$a' + c + 2x : x = a' + c + 2x + a' : b \qquad \text{[Equation 4]}$$
$$\to 2bx + a'b + bc = (2a' + c)x + 2x2$$
$$\to 2x2 + (2a' - 2b + c)x - a'b - bc = 0$$
$$\to x = \frac{-(2a' - 2b + c) \pm \sqrt{(2a' - 2b + c)2 + 8(a'b + bc)}}{4}$$
$$(\therefore a, b, c, x, z > 0)$$

The design apparatus 100 according to one or more embodiments may design the coaxial light 230 based on the size (2×) of the coaxial light 230.

Figure 6A:
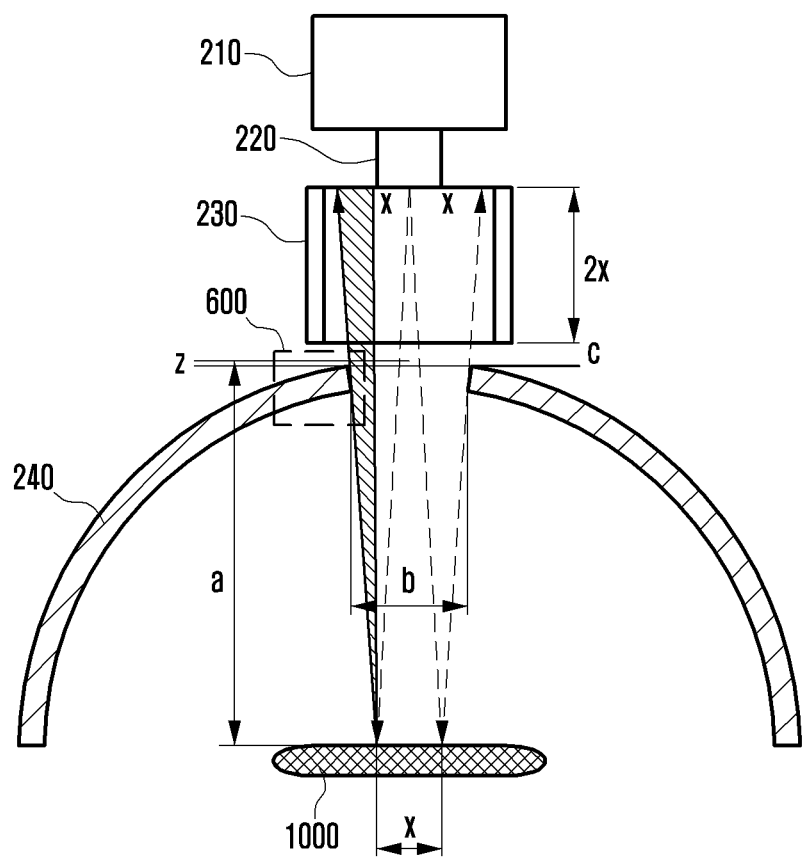
FIGS. 6A and 6B are diagrams of an optical system used to describe a scheme for determining the PCB structure inside the dome light in the optical system design method employed by the design apparatus according to one or more embodiments.
Figure 6B:
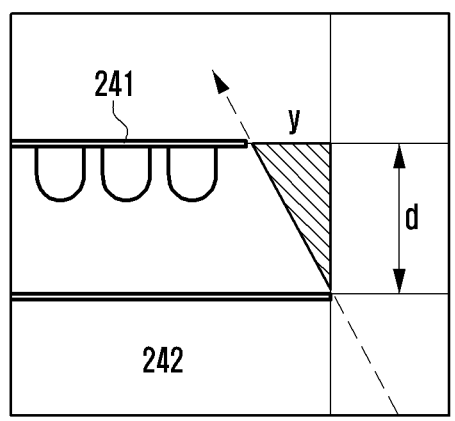

FIGS. 6A and 6B are diagrams of an optical system 200 used to describe a scheme for determining the PCB structure inside the dome light 240 in the optical system design method employed by the design apparatus 100 according to one or more embodiments.

FIGS. 6A and 6b may be diagrams shown to describe operation 330 in FIG. 3.

In FIGS. 6A and 6B, 'a' may be the radius of the dome light 240, 'x' may be the size of the coaxial light 230, 'y' may be the size difference between the PCB 241 and the diffuser 242 in the dome light 240, and 'd' may be the thickness of the dome light 240.

FIG. 6A illustrates the overall structure of the optical system 200 to be designed according to one or more embodiments.

FIG. 6B shows the inside of the dome light 240, including a region 600 in FIG. 6A, which includes the dome light 240 and the PCB 241. With reference to FIG. 6B, the design apparatus 100 may determine the size difference (y) between the PCB 241 and the diffuser 242 in the dome light 240 by using a triangle having the size difference (y) between the PCB 241 and the diffuser 242 in the dome light 240 as base and the thickness (d) of the dome light 240 as height, and a triangle having ¼ (x/2) of the size of the coaxial light 230 as base and the value (a'+2×) obtained by summing together the value (a') obtained by subtracting the radius reduction (z) according to the hole of the dome light 240 from the radius (a) of the dome light 240 and the size (2×) of the coaxial light 230 as height.

A PCB 241 and/or a diffuser 242 may be included inside the dome light 240, and the design apparatus 100 can design the PCB 241 on which LEDs are mounted and the diffuser 242 so that non-uniform points do not occur inside the dome light 240.

The design apparatus 100 according to an embodiment may determine the size difference (y) between the PCB 241 and the diffuser 242 in the dome light 240 on the basis of the value (a') obtained by subtracting the radius reduction (z) according to the hole of the dome light 240 from the radius (a) of the dome light 240, the size (2×) of the coaxial light 230, and the thickness (d) of the dome light 240.

Based on similarities of right triangles and Equations 3 and 4, the size difference (y) between the PCB 241 and the diffuser 242 in the dome light 240 can be defined as Equation 5.

$$a' + 2x : \frac{x}{2} = d : y \qquad \text{[Equation 5]}$$
$$\rightarrow y = \frac{dx}{2a' + 4x}$$

The design device 100 according to one or more embodiments may design the structure of the PCB 241 based on the size difference (y) between the PCB 241 and the diffuser 242 in the dome light 240.

Figure 7:
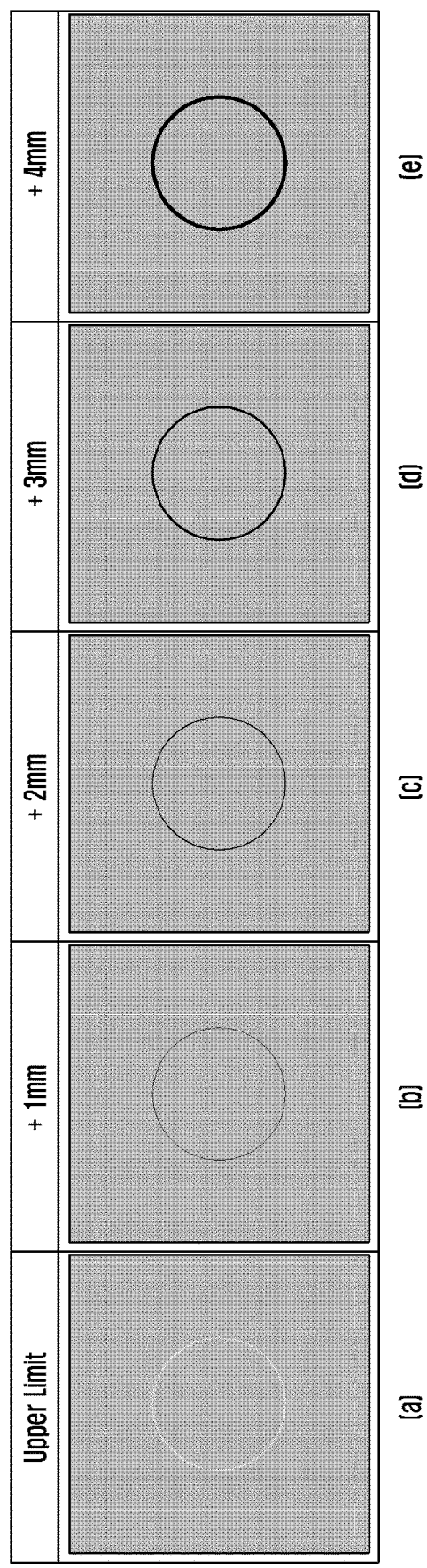
FIG. 7 illustrates image results of experiments depending on the distance between the dome light and the coaxial light in the optical system according to one or more embodiments.

FIG. 7 illustrates image results of experiments depending on the distance (c) between the dome light 240 and the coaxial light 230 in the optical system 200 according to one or more embodiments.

Parts (a) to (e) may be images of light rays that are emitted from the dome light 240 and/or the coaxial light 230, are reflected on the object 1000, and are captured by the camera 210 in the optical system 200.

Part (a) may be an image when the distance (c) between the dome light 240 and the coaxial light 230 is determined according to operation 310 in FIG. 3; part (b) may be an image when the distance (c) between the dome light 240 and the coaxial light 230 is determined to be 1 mm larger than that of part (a); part (c) may be an image when the distance (c) between the dome light 240 and the coaxial light 230 is determined to be 2 mm larger than that of part (a); part (d) may be an image when the distance (c) between the dome light 240 and the coaxial light 230 is determined to be 3 mm larger than that of part (a); part (e) may be an image when the distance (c) between the dome light 240 and the coaxial light 230 is determined to be 4 mm larger than that of part (a).

With reference to parts (a) to (e), in the optical system 200, when the distance (c) between the dome light 240 and the coaxial light 230 is determined according to operation 310 in FIG. 3 as shown in part (a), non-uniformity can be kept to a minimum. As shown in parts (b) to (e), as the distance (c) between the dome light 240 and the coaxial light 230 increases, the light ray reflected by the object 1000 may reach the side surface of the coaxial light 230, thereby causing non-uniformity.

Figure 8:
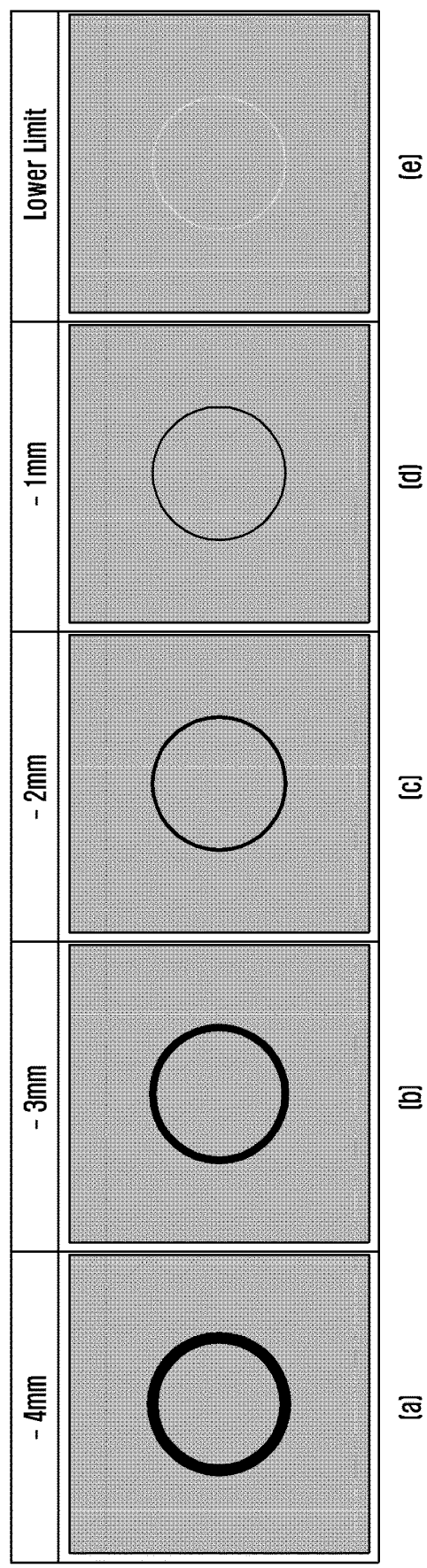
FIG. 8 illustrates image results of experiments depending on the size of the coaxial light in the optical system according to one or more embodiments.

FIG. 8 illustrates image results of experiments depending on the size (2×) of the coaxial light 230 in the optical system 200 according to one or more embodiments.

Parts (a) to (e) may be images of light rays that are emitted from the dome light 240 and/or the coaxial light 230, are reflected on the object 1000, and are captured by the camera 210 in the optical system 200.

Part (e) may be an image when the size (2×) of the coaxial light 230 is determined according to operation 320 in FIG. 3; part (a) may be an image when the size (2×) of the coaxial light 230 is determined to be 4 mm smaller than that of part (e); part (b) may be an image when the size (2×) of the coaxial light 230 is determined to be 3 mm smaller than that of part (e); part (c) may be an image when the size (2×) of the coaxial light 230 is determined to be 2 mm smaller than that of part (e); part (d) may be an image when the size (2×) of the coaxial light 230 is determined to be 1 mm smaller than that of part (e).

With reference to parts (a) to (e), in the optical system 200, when the size (2×) of the coaxial light 230 is determined according to operation 320 in FIG. 3 as shown in part (e), non-uniformity can be kept to a minimum. As shown in parts (a) to (d), as the size (2×) of the coaxial light 230 becomes smaller, the light ray reflected by the object 1000 may reach the side surface of the coaxial light 230, thereby causing non-uniformity.

Figure 9:
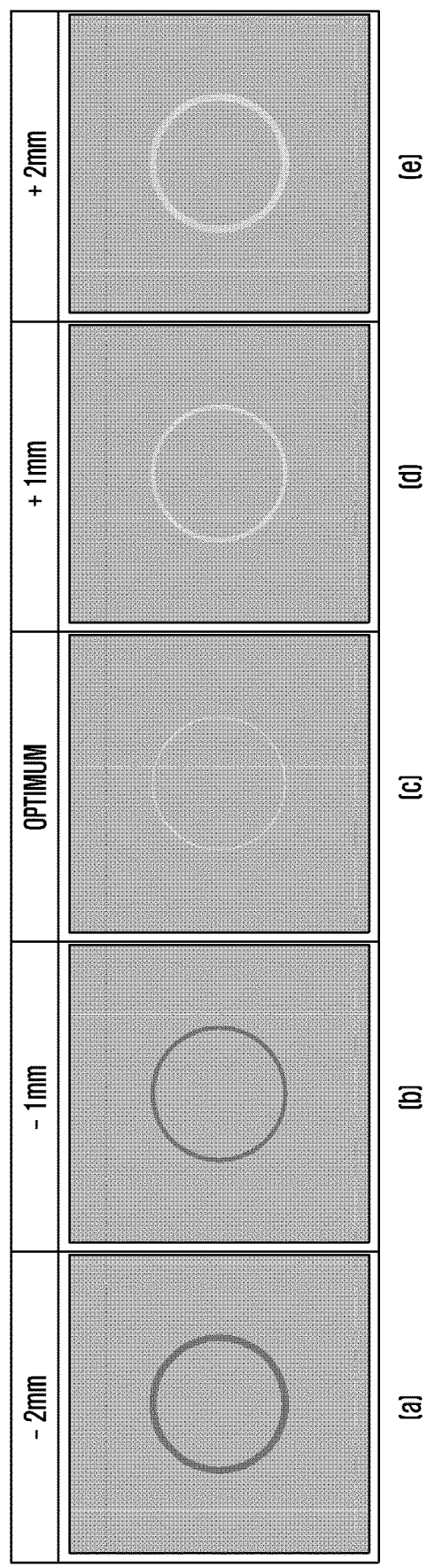
FIG. 9 illustrates image results of experiments depending on the PCB structure inside the dome light in the optical system according to an embodiment.

FIG. 9 illustrates image results of experiments depending on the PCB structure inside the dome light 240 in the optical system 200 according to one or more embodiments.

Images (a) to (e) may be images of light rays that are emitted from the dome light 240 and/or the coaxial light 230, are reflected on the object 1000, and are captured by the camera 210 in the optical system 200.

Image (c) may be an image when the PCB structure inside the dome light 240 is determined according to operation 330 in FIG. 3; image (a) may be an image when the size difference (y) between the PCB 241 and the diffuser 242 is determined to be 2 mm smaller than that of image (c); image (b) may be an image when the size difference (y) between the PCB 241 and the diffuser 242 is determined to be 1 mm smaller than that of image (c); image (d) may be an image when the size difference (y) between the PCB 241 and the diffuser 242 is determined to be 1 mm larger than that of image (c); image (e) may be an image when the size difference (y) between the PCB 241 and the diffuser 242 is determined to be 2 mm larger than that of image (c).

With reference to images (a) to (e), in the optical system 200, when the size difference (y) between the PCB 241 and the diffuser 242 in the dome light 240 is determined according to operation 330 in FIG. 3 as shown in image (c), non-uniformity can be kept to a minimum. As in images (a) and (b), as the size difference (y) between the PCB 241 and the diffuser 242 in the dome light 240 increases, the optical path of the light ray reflected by the object 1000 is blocked, thereby causing non-uniformity. As in images (d) and (e), as the size difference (y) between the PCB 241 and the diffuser 242 in the dome light 240 decreases, the size of the region not illuminated by the LEDs of the PCB 241 increases, thereby causing non-uniformity.

A method of designing an optical system 200 including a dome light 240 and a coaxial light 230 according to one or more embodiments may include: determining the distance between the dome light 240 and the coaxial light 230 based on the radius reduction according to the hole of the dome light 240; determining the size of the coaxial light 230 based on the optical path of a light ray emitted from the coaxial light 230; and determining the structure of the PCB 241 in the dome light 240 based on the optical path through which a light ray emitted from the coaxial light 230 is reflected by the object and returns.

In the method of designing the optical system 200 according to one or more embodiments, determining the distance between the dome light 240 and the coaxial light 230 may include determining the radius reduction according to the hole of the dome light 240 based on the radius of the dome light 240 and the size of the hole of the dome light 240.

In the method of designing the optical system 200 according to one or more embodiments, determining the distance between the dome light 240 and the coaxial light 230 may include determining the radius reduction according to the hole of the dome light 240 by using a triangle whose hypotenuse is equal to the radius of the dome light 240, whose base is equal to one half of the hole size of the dome light 240, and whose height is equal to the value obtained by subtracting the radius reduction according to the hole from the radius of the dome light 240.

In the method of designing the optical system 200 according to one or more embodiments, determining the size of the coaxial light 230 may include determining the size of the coaxial light 230 based on the value obtained by subtracting the radius reduction according to the hole of the dome light 240 from the radius of the dome light 240, the size of the hole of the dome light 240, and the distance between the dome light 240 and the coaxial light 230.

In the method of designing the optical system 200 according to one or more embodiments, determining the size of the coaxial light 230 may include determining the size of the coaxial light 230 by using an isosceles triangle whose base is equal to the size of the coaxial light 230 and whose height is equal to a value based on the size of the coaxial light 230, the distance between the dome light 240 and the coaxial light 230, and the value obtained by subtracting the radius reduction according to the hole of the dome light 240 from the radius of the dome light 240.

In the method of designing the optical system 200 according to one or more embodiments, the dome light 240 may include the PCB 241 on which LEDs are mounted and a diffuser 242, and determining the structure of the PCB 241 in the dome light 240 may include determining the structure of the PCB 241 based on the size difference between the PCB 241 and the diffuser 242.

In the method of designing the optical system 200 according to one or more embodiments, determining the structure of the PCB 241 in the dome light 240 may include determining the size difference between the PCB 241 and the diffuser 242 on the basis of the value obtained by subtracting the radius reduction according to the hole of the dome light 240 from the radius of the dome light 240, the size of the coaxial light 230, and the thickness of the dome light 240.

In the method of designing the optical system 200 according to one or more embodiments, determining the structure of the PCB 241 in the dome light 240 may include determining the size difference between the PCB 241 and the diffuser 242 by using a triangle whose base is equal to the size difference between the PCB 241 and the diffuser 242 and whose height is equal to the thickness of the dome light 240, and a triangle whose base is equal to ¼ of the size of the coaxial light 230 and whose height is equal to the value obtained by summing together the value obtained by subtracting the radius reduction according to the hole of the dome light 240 from the radius of the dome light 240 and the size of the coaxial light 230.

An optical system 200 according to one or more embodiments may include a dome light 240 and a coaxial light 230, wherein the dome light 240 and the coaxial light 230 may be arranged in correspondence to the distance between the dome light 240 and the coaxial light 230 determined based on the radius reduction according to the hole of the dome light 240, the size of the coaxial light 230 may be determined based on the optical path of a light ray emitted from the coaxial light 230, the structure of a PCB 241 in the dome light 240 may be determined based on the optical path through which a light ray emitted from the coaxial light 230 is reflected by the object and returns.

In the optical system 200 according to one or more embodiments, the radius reduction according to the hole of the dome light 240 may be determined based on the radius of the dome light 240 and the size of the hole of the dome light 240.

In the optical system 200 according to one or more embodiments, the radius reduction according to the hole of the dome light 240 may be determined by using a triangle whose hypotenuse is equal to the radius of the dome light 240, whose base is equal to one half of the hole size of the dome light 240, and whose height is equal to the value obtained by subtracting the radius reduction according to the hole from the radius of the dome light 240.

In the optical system 200 according to one or more embodiments, the size of the coaxial light 230 may be determined based on the value obtained by subtracting the radius reduction according to the hole of the dome light 240 from the radius of the dome light 240, the size of the hole of the dome light 240, and the distance between the dome light 240 and the coaxial light 230.

In the optical system 200 according to one or more embodiments, the size of the coaxial light 230 may be determined by using an isosceles triangle whose base is equal to the size of the coaxial light 230 and whose height is equal to a value based on the size of the coaxial light 230, the distance between the dome light 240 and the coaxial light 230, and the value obtained by subtracting the radius reduction according to the hole of the dome light 240 from the radius of the dome light 240.

In the optical system 200 according to one or more embodiments, the dome light 240 may include the PCB 241 on which LEDs are mounted and a diffuser 242, and the structure of the PCB 241 may be determined based on the size difference between the PCB 241 and the diffuser 242.

In the optical system 200 according to one or more embodiments, the size difference between the PCB 241 and the diffuser 242 may be determined based on the value obtained by subtracting the radius reduction according to the hole of the dome light 240 from the radius of the dome light 240, the size of the coaxial light 230, and the thickness of the dome light 240.

In the optical system 200 according to one or more embodiments, the size difference between the PCB 241 and the diffuser 242 may be determined by using a triangle whose base is equal to the size difference between the PCB 241 and the diffuser 242 and whose height is equal to the thickness of the dome light 240, and a triangle whose base is equal to ¼ of the size of the coaxial light 230 and whose height is equal to the value obtained by summing together the value obtained by subtracting the radius reduction according to the hole of the dome light 240 from the radius of the dome light 240 and the size of the coaxial light 230.

A design apparatus 100 for designing an optical system 200 including a dome light 240 and a coaxial light 230 according to one or more embodiments may be configured to determine the distance between the dome light 240 and the coaxial light 230 based on the radius reduction according to the hole of the dome light 240, determine the size of the coaxial light 230 based on the optical path of a light ray emitted from the coaxial light 230, and determine the structure of a PCB 241 in the dome light 240 based on the optical path through which a light ray emitted from the coaxial light 230 is reflected by the object and returns.

In the design apparatus 100 for designing the optical system 200 including a dome light 240 and a coaxial light 230 according to one or more embodiments, the design apparatus 100 may be configured to determine the radius reduction according to the hole of the dome light 240 by using a triangle whose hypotenuse is equal to the radius of the dome light 240, whose base is equal to one half of the hole size of the dome light 240, and whose height is equal to the value obtained by subtracting the radius reduction according to the hole from the radius of the dome light 240.

In the design apparatus 100 for designing the optical system 200 including a dome light 240 and a coaxial light 230 according to one or more embodiments, the design apparatus 100 may be configured to determine the radius reduction according to the hole of the dome light 240 by using a triangle whose hypotenuse is equal to the radius of the dome light 240, whose base is equal to one half of the hole size of the dome light 240, and whose height is equal to the value obtained by subtracting the radius reduction according to the hole from the radius of the dome light 240.

In the design apparatus 100 for designing the optical system 200 including a dome light 240 and a coaxial light 230 according to one or more embodiments, the design apparatus 100 may be configured to determine the size difference between the PCB 241 and the diffuser 242 by using a triangle whose base is equal to the size difference between the PCB 241 and the diffuser 242 and whose height is equal to the thickness of the dome light 240, and a triangle whose base is equal to ¼ of the size of the coaxial light 230 and whose height is equal to the value obtained by summing together the value obtained by subtracting the radius reduction according to the hole of the dome light 240 from the radius of the dome light 240 and the size of the coaxial light 230.

The optical system design method an according to one or more embodiments can provide a uniform analysis environment for high-gloss objects.

The optical system design method according to one or more embodiments can provide an optical system capable of analyzing the surface of an object with a complex shape.

The optical system design method according to one or more embodiments can provide a general-purpose uniform optical system for high-gloss objects, thereby reducing development time associated with optical system review.

The optical system design method according to one or more embodiments can greatly contribute to improving product quality and reducing costs by reliably providing information on the surface of a stationary or moving metal object.

The optical system design method according to one or more embodiments can find various defects on the surface of final production products and contribute to product quality control based on this.

The electronic devices according to various embodiments of the disclosure may be devices of various types. The electronic devices may include, for example, a portable communication device (e.g., smartphone), a computer equipment, a portable multimedia device, a portable medical device, a camera, a wearable device, or a home appliance. The electronic devices according to embodiments of the disclosure are not limited to the above-described devices.

Various embodiments of the disclosure and terms used therein are not intended to limit the technical features described herein to specific embodiments, and should be understood as including various modifications, equivalents, or substitutes of a corresponding embodiment. With regard to the description of the drawings, similar reference symbols may be used to refer to similar or related elements. A singular form of a noun corresponding to a specific item may include one or multiple pieces of the item unless the relevant context clearly indicates otherwise. Herein, each of phrases such as "A or B", "at least one of A and B", "at least one of A or B", "A, B or C", "at least one of A, B and C", and "at least one of A, B or C" may include any one of or all possible combinations of the items enumerated together in the corresponding one of the phrases. Terms such as "1st" and "2nd", or "first" and "second" may be used to simply distinguish a corresponding component from another, and does not limit the components in other aspect (e.g., importance or order). When an element (e.g., first element) is referred to, with or without the term "operably" or "communicatively", as "coupled to/with" or "connected to/with" another element (e.g., second element), this means that the element may be connected or coupled to the other element directly (e.g., wiredly), wirelessly, or via a third element.

The term "module" used herein may include a unit implemented in hardware, software, or firmware, and may be used interchangeably with other terms, for example, "logic", "logic block", "component", or "circuit". A module may be a single integral component, or a minimum unit or part thereof performing one or more functions. For example, according to an embodiment, a module may be implemented in a form of an application-specific integrated circuit (ASIC).

Various embodiments of the disclosure may be implemented as software (e.g., programs #40) including one or more instructions that are stored in a storage medium (e.g., internal memory #36 or external memory #38) readable by a machine (e.g., electronic device #01). One or more processors (e.g., processor #20) of the machine (e.g., electronic device #01) may invoke at least one of the one or more instructions stored in the storage medium to execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., electromagnetic wave), but this term does not distinguish whether data is stored semi-permanently or temporarily in the storage medium.

According to an embodiment, a method according to various embodiments of the disclosure may be provided by being included in a computer program product. The computer program product may be traded as a commodity between a seller and a purchaser. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a machine readable storage medium such as a memory of a manufacturer's server, an application store's server, or a relay server.

According to various embodiments, each component (e.g., module or program) of the above-described components may include a single entity or multiple entities, and some of the multiple entities may be separately arranged on other components. According to various embodiments, one or more components or operations may be omitted from the above-described components, or one or more other components or operations may be added. Alternatively or additionally, a plurality of components (e.g., modules or programs) may be integrated into a single component. In this case, the integrated component may perform one or more functions of each of the plurality of components in the same or similar manner as they are performed by a corresponding one of the plurality of components before the integration. According to various embodiments, operations performed by a module, a program, or another component may be carried out in sequence, in parallel, by repetition, or heuristically, or one or more of the operations may be executed in a different order or may be omitted, and one or more other operations may be added.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A method of designing an optical system including a dome light and a coaxial light, the method comprising:
   determining a distance between the dome light and the coaxial light based on a radius reduction according to a hole of the dome light;
   determining a size of the coaxial light based on an optical path of a light ray emitted from the coaxial light; and
   determining a structure of a printed circuit board (PCB) in the dome light based on an optical path through which the light ray emitted from the coaxial light is reflected by an object.

2. The method of claim 1, wherein the determining the distance between the dome light and the coaxial light comprises determining the radius reduction according to the hole of the dome light based on a radius of the dome light and a size of the hole of the dome light.

3. The method of claim 2, wherein the determining the distance between the dome light and the coaxial light comprises determining the radius reduction according to the hole of the dome light by using a spatial relationship of a triangle having a hypotenuse corresponding to the radius of the dome light, a base corresponding to one half of the size of the hole of the dome light, and a height corresponding to a difference between the radius reduction according to the hole of the dome light and the radius of the dome light.

4. The method of claim 1, wherein the determining the size of the coaxial light comprises determining the size of the coaxial light based on a difference between the radius reduction according to the hole of the dome light and a radius of the dome light, the size of the hole of the dome light, and the distance between the dome light and the coaxial light.

5. The method of claim 4, wherein the determining the size of the coaxial light further comprises determining the size of the coaxial light by using a spatial relationship of an isosceles triangle with a base corresponding to the size of the coaxial light and with a height corresponding to the size of the coaxial light, the distance between the dome light and the coaxial light, and the difference between the radius reduction according to the hole of the dome light and the radius of the dome light.

6. The method of claim 1, wherein the dome light comprises the PCB, a plurality of light emitting diodes (LEDs) mounted on the PCB, and a diffuser; and
   wherein the determining the structure of the PCB in the dome light comprises determining the structure of the PCB based on a size difference between the PCB and the diffuser.

7. The method of claim 6, wherein the determining the structure of the PCB in the dome light comprises determining the size difference between the PCB and the diffuser based on a difference between the radius reduction according to the hole of the dome light and a radius of the dome light, the size of the coaxial light, and a thickness of the dome light.

8. The method of claim 7, wherein the determining the structure of the PCB in the dome light comprises determining the size difference between the PCB and the diffuser by using a spatial relationship of a first triangle having a base corresponding to the size difference between the PCB and the diffuser and a height corresponding to the thickness of the dome light, and a spatial relationship of a second triangle having a base corresponding to ¼ of the size of the coaxial light and a height corresponding to a thethe difference between the radius reduction according to the hole of the dome light and the radius of the dome light, and the size of the coaxial light.

9. An optical system comprising:
   a dome light comprising a printed circuit board (PCB); and
   a coaxial light,
   wherein the dome light and the coaxial light are arranged in correspondence to a distance between the dome light and the coaxial light, based on a radius reduction according to a hole of the dome light,
   wherein a size of the coaxial light is based on an optical path of a light ray emitted from the coaxial light, and
   wherein a structure of the PCB of the dome light is based on an optical path through which the light ray emitted from the coaxial light is reflected by an object.

10. The optical system of claim 9, wherein the radius reduction according to the hole of the dome light is based on a radius of the dome light and a size of the hole of the dome light.

11. The optical system of claim 10, wherein the radius reduction according to the hole of the dome light is determined by using a spatial relationship of a triangle having a hypotenuse corresponding to the radius of the dome light, a base corresponding to one half of the size of the hole of the dome light, and a height corresponding to a difference between the radius reduction according to the hole of the dome light and the radius of the dome light.

12. The optical system of claim 9, wherein the size of the coaxial light is based on a difference between the radius reduction according to the hole of the dome light a radius of the dome light, a size of the hole of the dome light, and the distance between the dome light and the coaxial light.

13. The optical system of claim 12, wherein the size of the coaxial light is determined by using a spatial relationship of an isosceles triangle having a base corresponding to the size of the coaxial light and a height corresponding to the size of the coaxial light, the distance between the dome light and the coaxial light, and the difference between the radius reduction according to the hole of the dome light and the radius of the dome light.

14. The optical system of claim 9, wherein the dome light further comprises a plurality of LEDs mounted on the PCB and a diffuser; and
   wherein the structure of the PCB is based on a size difference between the PCB and the diffuser.

15. The optical system of claim 14, wherein the size difference between the PCB and the diffuser is based on a difference between the radius reduction according to the hole of the dome light and a radius of the dome light, the size of the coaxial light, and a thickness of the dome light.

* * * * *